W. C. NORTH.
COMBINED VENT-SPIGOT AND PUMP.
No. 174,378. Patented March 7, 1876.
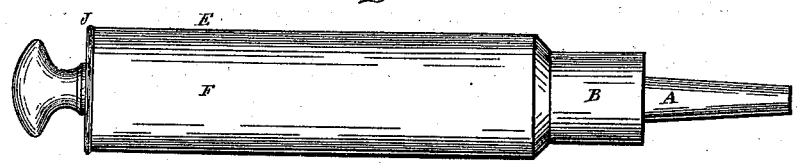
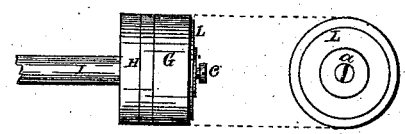 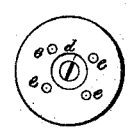 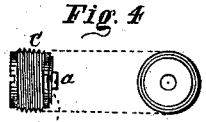
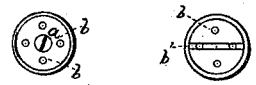 
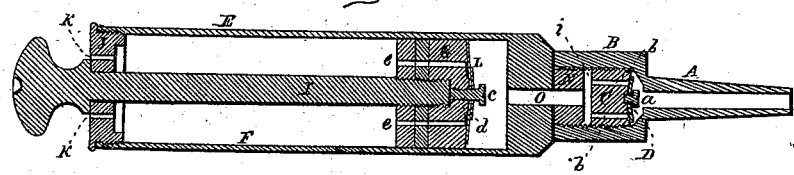
Witnesses.
A. J. Cornell.
B. G. Price
Inventor.
William C. North.
Rex. Burridge & Co.
Attys.

UNITED STATES PATENT OFFICE.

WILLIAM C. NORTH, OF CLEVELAND, OHIO.

IMPROVEMENT IN COMBINED VENT-SPIGOTS AND PUMPS.

Specification forming part of Letters Patent No. 174,378, dated March 7, 1876; application filed December 24, 1874.

*To all whom it may concern:*

Be it known that I, WM. C. NORTH, of Cleveland, in the county of Cuyahoga and State of Ohio, have invented new and useful Improvements in Ventilating - Spigot and Pump Combined, of which the following is a description, reference being had to the accompanying drawings making a part of this specification, in which—

Figure 1 is an outside view of the implement. Figs. 2, 3, 4, 5, and 6 are detached sections. Fig. 7 is a transverse longitudinal section.

Like letters of reference refer to like parts in the several views.

This invention is for ventilating beer-barrels and other barrels, and for forcing air into the same, in order to cause the contents of the barrel to flow, and to produce a pressure on the liquor while in the barrel, without allowing the gas and flavor of the liquor to escape.

The peculiar construction and operation of the invention are, substantially, as follows: The first part of the device consists of a tubular spigot, A, Figs. 1 and 7, having a conical end, having a head or chamber, B, in which is screwed a valve-seat, C, Fig. 7, a detached view of which is shown in Fig. 4, whereof D is the valve, secured thereto by a set-screw, *a*. It will be observed that the seat of the valve is slightly concave. The valve consists of a thin disk of rubber, (or other appropriate material may be used.) Through the valve-seat are made holes or air-passages *b*, four in number, which, however, may be more or less. The second part of the invention consists of a pump, E, constructed as follows: F is the cylinder of the pump; G, the piston, and I the rod or stem working in a stuffing-box, J, through which are made air-passages K, Fig. 7. To the end of the piston is secured a valve, L, Fig. 7, by means of a set-screw, *c*. Said valve consists of a thin disk of rubber or other equivalent material. The end of the piston (the valve-seat) is slightly convex, at the center of which is a boss, *d*, as shown in Fig. 3. Through the piston are made air-passages *e*, Fig. 7, also shown in the detached view, Fig. 3. Said boss and air-passages are covered by the valve, as shown in Fig. 2.

The pump above described is attached to the spigot by being screwed into the head B thereof, as shown in Fig. 7, in which it will be seen that the end of the cylinder, or, rather, the screw N thereof, does not touch the valve-seat C, there being a small air-space, *i*, between them. It will also be seen in said Fig. 7 that in the end of the cylinder there is an air-passage, O, whereby the pump is put in communication with the tubular ventilating-spigot.

The operation of the above-described device is as follows: The spigot part of the device is driven into the barrel. The valve D, while it prevents the outflow of the barrel's contents by closing the air-passages *b*, will, when the pressure of the air on the outside of the barrel is so great as to prevent the flow of the liquor, open and allow sufficient air to pass into the barrel to cause the liquor to run out. Hence, on drawing the liquor through the faucet, a constant supply of air is admitted into the barrel through the spigot to fill the vacuum above the liquor as fast as it may be formed by the constant drawing off of the contents of the barrel without allowing any of the gases or the flavor of the liquor to escape.

It is often found necessary on drawing off a portion of a barrel of beer to have what is left remain under a strong pressure of air, to prevent it from souring, which it will do if allowed to remain without such pressure for any considerable time. To produce this pressure on the beer is the purpose of the pump above described, and which is applied to the spigot, as shown in Fig. 7. Now, on drawing back the piston from its position shown in Fig. 7, no vacuum will be formed between it and the spigot, as the air from the outside will pass in through the air-passages K of the stuffing-box into the cylinder, thence through the piston to the spigot; and if the pressure of the air on the valve D be strong enough, it will open the spigot-valve and rush into the barrel, whereas, if the air does not make its way into the barrel, it can be forced in by the pump, the air opening the spigot-valve, and at the same time closing the valve L of the piston, so that the air cannot escape back through the piston.

By this means a strong pressure of air can be exerted upon the contents of the barrel. The pump, when not required for the purpose specified, may be detached from the spigot and laid aside. The spigot left in the barrel may be allowed to remain therein permanently as a fixture of the barrel for ventilation. The dealers in the liquor, being provided with a pump, can apply the same to the spigot when necessary. It is not necessary, however, to remove the pump in order that the spigot may act as a ventilator, as it will act equally well for that purpose whether the pump be attached to it or not.

What I claim as my invention, and desire to secure by Letters Patent, is—

1. In a vent-spigot and pump combined, the detachable spigot A, consisting of a tubular conical end, chamber B, valve-seat C, having air-passages $b$, and valve D, arranged and combined substantially as and for the purpose set forth.

2. In combination with the tubular ventilating-spigot A, the pump E, consisting of the cylinder F, stuffing-box J, provided with air-passages K, piston G, having air-passages $e$, and valve L, in the manner as described, and for the purpose specified.

WILLIAM C. NORTH.

Witnesses:
J. H. BURRIDGE,
A. F. CORNELL.